United States Patent
Jerrell et al.

(10) Patent No.: US 7,886,702 B2
(45) Date of Patent: Feb. 15, 2011

(54) DISTRIBUTED ENGINE CONTROL SYSTEM

(75) Inventors: James Gregory Jerrell, San Diego, CA (US); Paul D. Zafuta, San Diego, CA (US)

(73) Assignee: Precision Engine Controls Corporation, San Diego, CA (US)

( * ) Notice: Subject to any disclaimer, the term of this patent is extended or adjusted under 35 U.S.C. 154(b) by 0 days.

(21) Appl. No.: 12/491,399

(22) Filed: Jun. 25, 2009

(65) Prior Publication Data

US 2010/0332105 A1 Dec. 30, 2010

(51) Int. Cl.
*F02C 1/00* (2006.01)
*F02C 9/26* (2006.01)
*F02B 63/00* (2006.01)

(52) U.S. Cl. .................. 123/3; 123/DIG. 8; 60/790; 60/734

(58) Field of Classification Search .............. 123/2, 123/3, DIG. 8, 436, 689, 691, 492, 493, 494; 701/103–105; 73/114.42; 60/612, 790, 734, 60/340, 363, 793

See application file for complete search history.

(56) References Cited

U.S. PATENT DOCUMENTS

| | | | | |
|---|---|---|---|---|
| 3,166,902 A | * | 1/1965 | Meyer et al. | 60/792 |
| 3,526,091 A | * | 9/1970 | Schuster | 60/791 |
| 5,771,860 A | * | 6/1998 | Bernardi | 123/352 |
| 6,073,592 A | * | 6/2000 | Brown et al. | 123/27 GE |
| 7,104,071 B2 | * | 9/2006 | Braun et al. | 60/775 |
| 7,293,415 B2 | * | 11/2007 | Hoffmann et al. | 60/775 |
| 7,481,061 B2 | * | 1/2009 | Gadde et al. | 60/778 |
| 7,600,417 B2 | * | 10/2009 | Paradise | 73/114.42 |
| 7,681,401 B2 | * | 3/2010 | Ziminsky et al. | 60/773 |

* cited by examiner

*Primary Examiner*—Hai H Huynh
(74) *Attorney, Agent, or Firm*—Stephen G. Mican

(57) ABSTRACT

A method and apparatus for distributing control of multiple engines amongst the engines in a power generation system that has a central controller, comprises the steps of: receiving aboard each engine from the central controller a control signal representative of a desired fuel flow; metering fuel at a fuel metering point aboard each engine; sensing at least one parameter aboard each engine proximate the fuel metering point that is representative of fuel flow; adjusting the fuel metering aboard each engine to cause the sensed parameter to correlate to the desired fuel flow; and transmitting a monitoring signal from each engine to the central controller that is representative of the adjusted fuel metering.

24 Claims, 1 Drawing Sheet

DISTRIBUTED ENGINE CONTROL SYSTEM

FIELD OF THE INVENTION

The invention relates to engine control systems, and more particularly to control of power systems that comprise multiple engines.

BACKGROUND OF THE INVENTION

Many power systems have applications that require multiple engines. For instance, electrical power systems may have multiple gas turbines, each with their own electrical generator load that contributes power to an electrical power grid. It is important to monitor and control the output of the engines so that the power that their respective generators contribute to the grid is such that their total cumulative power stays within a desired cumulative power level range at all times.

Control systems for controlling the power of the engines in the system generally rely on the function of a central controller for monitoring and controlling the operation of all the engines in the system. Because monitoring and control of each engine requires multiple transducers per engine, both the central controller and the communications link between the central controller and the engines may become complex and require high data rates.

SUMMARY OF THE INVENTION

The invention generally comprises a method and apparatus for distributing control of multiple engines amongst the engines in a power generation system that has a central controller, comprising the steps of: receiving aboard each engine from the central controller a control signal representative of a desired fuel flow; metering fuel at a fuel metering point aboard each engine; sensing at least one parameter aboard each engine proximate the fuel metering point that is representative of fuel flow; adjusting the fuel metering aboard each engine to cause the sensed parameter to correlate to the desired fuel flow; and transmitting a monitoring signal from each engine to the central controller that is representative of the adjusted fuel metering.

DETAILED DESCRIPTION OF THE INVENTION

Figure 1:
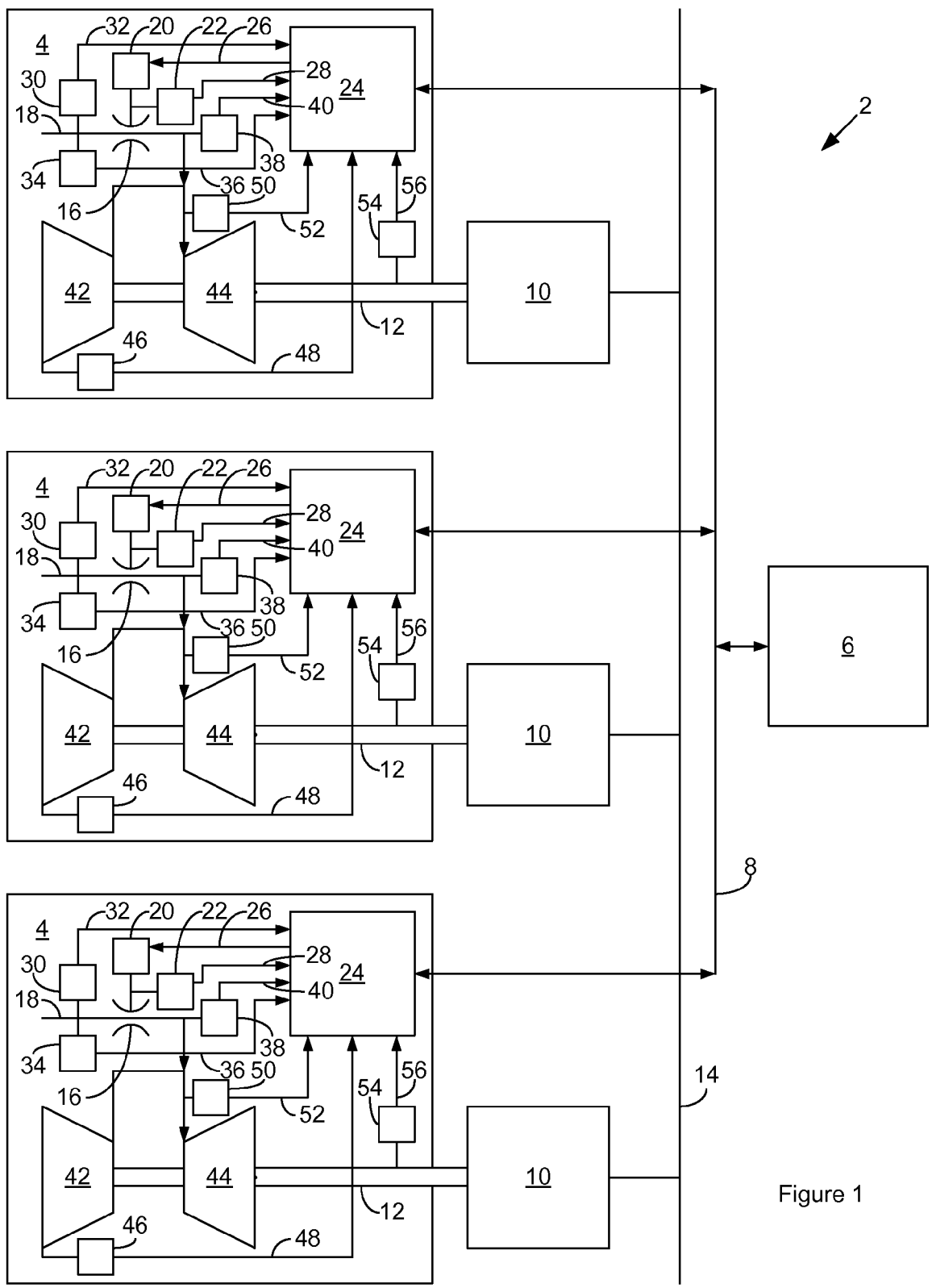
FIG. 1 is a schematic diagram of a distributed engine control system according to a possible embodiment of the invention.

FIG. 1 is a schematic diagram of distributed engine control system 2 according to a possible embodiment of the invention. The control system comprises multiple engines 4 in communication with a central controller 6 by way of a wired or wireless communications link 8. For purposes of illustration only, FIG. 1 shows three of the engines 4, and engines 4 of the gas turbine type. The control system 2 may alternatively have as little as two engines 4 or more than three engines 4, and the engines 4 may be of another type, such as of the reciprocating internal combustion type. Each engine 4 drives a load 10 by way of an engine drive shaft 12. The load 10 may be mechanical or electrical. By way of example only, FIG. 1 shows each load 10 as an electrical generator, with each electrical generator load 10 coupled to a common electrical grid 14.

Each engine 14 has a fuel control valve 16 for metering fuel at a fuel metering point along a fuel line 18. The valve 16 has at least a valve actuator 20 and a valve position sensor 22 that senses the position of the valve 16. A fuel valve controller 24 drives the actuator 20 with an actuator drive signal by way of an actuator control line 26. The valve position sensor 22 generates a valve position signal representative of valve position and transmits it to the valve controller 24 by way of a valve position signal line 28.

In one mode of operation, the central controller 6 may transmit a control signal representative of a desired fuel flow to each engine 4 by way of its fuel line 18, such as a desired fuel valve position signal or a desired fuel flow signal. If the control signal comprises a desired valve position signal, the valve controller 24 compares the valve position signal that it receives on the valve position signal line 28 and generates a respective actuator drive signal on the actuator control line 26 to adjust the position of the valve 16 so that the valve position signal on the valve position line 28 correlates to the control signal from the central controller 6 that represents desired valve position. If the control signal comprises a desired flow signal, the valve controller 24 may correlate the control signal with a desired position of the valve 16 and generate a respective actuator drive signal on the actuator control line 26 to adjust the position of the valve 16 so that the valve position signal on the valve position line 28 correlates to the desired valve position. The valve controller 24 may transmit a monitoring signal to the central controller 6 by way of the communications link 8 that is representative of the adjusted fuel metering, such as the valve position signal on the valve position line 28.

The valve controller 24 may correlate the position of the valve 16 as represented by the valve position signal on the valve position line 28 with the effective flow area of the fuel at the fuel metering point along the fuel line 18. Furthermore, the valve controller 24 may correlate the position of the valve 16 as represented by the valve position signal on the valve position line 28 with actual fuel flow through the fuel line 18 and generate the monitoring signal as representing this actual fuel flow.

The valve controller 24 may receive additional signals from additional sensors that represent other fuel flow parameters. For instance, an upstream fuel pressure sensor 30 that senses fuel pressure upstream of the fuel metering point may generate an upstream fuel pressure signal representative of the sensed pressure on an upstream fuel pressure signal line 32. A fuel temperature sensor 34 that senses fuel temperature upstream of the fuel metering point may generate an upstream fuel temperature signal representative of the sensed temperature on an upstream fuel temperature signal line 36. A downstream fuel pressure sensor 38 that senses fuel pressure downstream of the fuel metering point may generate a downstream fuel pressure signal representative of the sensed pressure on a downstream fuel pressure signal line 40.

The valve controller 24 may correlate the effective flow area of the valve 18 as represented by the valve position signal on the valve position line 28, the upstream fuel pressure signal on the upstream fuel pressure signal line 32, the upstream fuel temperature signal on the upstream fuel temperature signal line 36 and the downstream fuel pressure signal on the downstream fuel pressure signal line 40 with actual fuel mass flow. In this case, the control signal from the central controller 6 may represent desired fuel mass flow, and the valve controller 24 may compare the actual fuel mass flow to the desired fuel mass flow and generate the actuator drive signal on the actuator control line 26 to adjust the position of the valve 16 so that the actual fuel mass flow matches the desired fuel mass flow.

Each engine 4 has a compressor 42 and a turbine 44 that couples to its drive shaft 12. A compressor inlet temperature sensor 46 may sense compressor inlet temperature and generate a compressor inlet temperature signal representative of the sensed temperature on a compressor inlet temperature signal line 48. A turbine inlet temperature sensor 50 may sense turbine inlet temperature and generate a turbine inlet temperature signal representative of the sensed temperature on a turbine inlet temperature signal line 52. An engine speed sensor 54 may sense engine speed and generate an engine speed signal representative of the measured speed on an engine speed signal line 56.

The valve controller 24 may analyse engine parameters as represented by the compressor inlet temperature signal on the compressor inlet temperature signal line 48, the turbine inlet temperature signal on the turbine inlet temperature signal line 52 and the engine speed signal on the engine speed signal line 56 and compare them with desired engine operating characteristics. The valve controller 24 may compare the actual engine operating characteristics to the desired engine operating characteristics and generate the actuator drive signal on the actuator control line 26 to adjust the position of the valve 16 so that the actual engine operating characteristics correlate with the desired engine operating characteristics. The desired engine operating characteristics may comprise setpoints, such as an engine speed setpoint and a turbine input temperature setpoint, and engine operating schedules, such as engine start, acceleration and deceleration schedules, speed-based fuel schedules and an engine temperature schedule.

The central controller 6 may correlate the monitoring signal that it receives from the valve controller 24 aboard each engine 4 with a level of a power system parameter, such as the level of power that the electrical generator load 10 of each engine 4 delivers to the common electrical grid 16, then compare the correlated power system level with a desired power system level and finally adjust its control signal that it transmits to the valve controller 24 aboard each engine 4 in response to any difference between the correlated power system level and the desired power system level. The desired power level may be a cumulative power level for all of the engines 4, in which case the central controller 6 correlates each monitor signal from the valve controller 24 of each engine 4 to a corresponding level of the power system parameter, combines the correlated engine power system levels to produce a cumulative correlated power system level and adjusts its control signal that it transmits to the valve controller 24 aboard each engine 4 in response to any difference between the cumulative correlated power system level and the desired power system level.

Since the central controller 6 and the communication link 8 only has to handle the monitoring signal from the valve controller 24 aboard each engine 4 and the controller 6 needs only transmit a control signal to the valve controller 24 aboard each engine 4 that represents a single desired fuel system parameter, the complexity and data rate of both are greatly reduced with the distributed control system 2. The described embodiments of the invention are only some illustrative implementations of the invention wherein changes and substitutions of the various parts and arrangement thereof are within the scope of the invention as set forth in the attached claims.

The invention claimed is:

1. A method for distributing control of multiple engines amongst the engines in a power generation system that has a central controller, comprising the steps of:
    receiving aboard each engine from the central controller a control signal representative of a desired fuel flow;
    metering fuel at a fuel metering point aboard each engine;
    sensing at least one parameter aboard each engine proximate the fuel metering point that is representative of fuel flow;
    adjusting the fuel metering aboard each engine to cause the sensed parameter to correlate to the desired fuel flow; and
    transmitting a monitoring signal from each engine to the central controller that is representative of the adjusted fuel metering.

2. The method of claim 1, wherein the control signal is representative of desired engine fuel demand and the step of sensing comprises sensing the effective flow area of the fuel at the fuel metering point.

3. The method of claim 2, further comprising the steps of:
    correlating aboard each engine the sensed parameter with actual fuel flow; and
    comparing the aboard each engine the actual fuel flow to the desired fuel flow for the engine.

4. The method of claim 3, wherein the step of sensing comprises sensing the effective flow area of the fuel at the fuel metering point, the fuel pressure upstream of the fuel metering point, the fuel temperature upstream of the fuel metering point and the fuel pressure downstream of the fuel metering point.

5. The method of claim 4, wherein the control signal represents desired fuel mass flow, the step of correlating comprises converting the sensed parameters to actual fuel mass flow, the step of comparing comprises comparing the actual fuel mass flow to the desired fuel mass flow and the monitoring signal represents actual fuel mass flow.

6. The method of claim 5, further comprising the steps of:
    sensing engine parameters aboard each engine;
    analysing the sensed engine parameters aboard each engine to generate actual engine operating characteristics;
    comparing the engine operating characteristics with desired engine operating characteristics aboard each engine; and
    adjusting the fuel metering aboard each engine to match the engine characteristics with the desired engine operating characteristics.

7. The method of claim 6, wherein the engines are gas turbine engines and the step of sensing comprises sensing engine compressor inlet temperature, engine speed and turbine inlet temperature.

8. The method of claim 7, wherein the desired engine characteristics comprise engine start, acceleration and deceleration schedules.

9. The method of claim 8, wherein the desired engine characteristics comprise engine speed-based fuel schedules and an engine temperature schedule.

10. The method of claim 1, further comprising:
    correlating the monitoring signal at the central controller with a level of a power system parameter;
    comparing the correlated power system level at the central controller with a desired power system level; and
    adjusting the control signal at the central controller in response to any difference between the correlated power system level and the desired power system level.

11. The method of claim 10, wherein the power generation system generates electric power and each engine drives a respective electrical generator.

12. The method of claim 11, wherein the desired power level is a cumulative power level for all the engines, the step of correlating comprises correlating each monitor signal from each engine to a corresponding level of the power system parameter, further comprising the step of combining the correlated power system levels to produce a cumulative correlated power system level, and wherein the step of adjusting comprises adjusting the control signal in response to any difference between the cumulative correlated power system level and the desired power system level.

13. A distributed engine control system for distributing control of multiple engines amongst the engines in a power generation system, comprising:

a central controller for transmitting a control signal representative of a desired fuel flow to each engine;

a fuel control valve aboard each engine for metering fuel at a fuel metering point aboard each engine;

at least one sensor aboard each engine for sensing at least one respective parameter aboard each engine proximate the fuel metering point that is representative of fuel flow; and a fuel valve controller aboard each engine for adjusting the fuel metering aboard each engine to cause the sensed parameter to correlate to the desired fuel flow and transmitting a monitoring signal from each engine to the central controller that is representative of the adjusted fuel metering.

14. The control system of claim 13, wherein the control signal is representative of desired engine fuel demand and the sensor senses the effective flow area of the fuel at the fuel metering point.

15. The control system of claim 14, wherein the fuel valve controller aboard each engine correlates the sensed parameter with actual fuel flow; and compares the actual fuel flow to the desired fuel flow for the engine.

16. The control system of claim 15, wherein the sensors aboard each engine sense the effective flow area of the fuel at the fuel metering point, the fuel pressure upstream of the fuel metering point, the fuel temperature upstream of the fuel metering point and the fuel pressure downstream of the fuel metering point.

17. The control system of claim 16, wherein the control signal represents desired fuel mass flow, the fuel valve controller aboard each engine converts the sensed parameters to actual fuel mass flow and compares the actual fuel mass flow to the desired fuel mass flow and the monitoring signal represents actual fuel mass flow.

18. The control system of claim 17, wherein:

the sensors aboard each engine sense engine parameters aboard each engine; and the fuel valve controller aboard each engine analyses the sensed engine parameters aboard each engine to generate actual engine operating characteristics, compares the engine operating characteristics with desired engine operating characteristics aboard each engine; and adjusts the fuel metering aboard each engine to match the engine characteristics with the desired engine operating characteristics.

19. The control system of claim 18, wherein the engines are gas turbine engines and the sensors aboard each engine sense engine compressor inlet temperature, engine speed and turbine inlet temperature.

20. The control system of claim 19, wherein the desired engine characteristics comprise engine start, acceleration and deceleration schedules.

21. The control system of claim 20, wherein the desired engine characteristics comprise engine speed-based fuel schedules and an engine temperature schedule.

22. The control system of claim 13, wherein the central controller correlates the monitoring signal with a level of a power system parameter, compares the correlated power system level with a desired power system level and adjusts the control signal in response to any difference between the correlated power system level and the desired power system level.

23. The control system of claim 22, wherein the power generation system generates electric power and each engine drives a respective electrical generator.

24. The control system of claim 23, wherein the desired power level is a cumulative power level for all the engines, the central controller correlates each monitor signal from each engine to a corresponding level of the power system parameter, combines the correlated engine power system levels to produce a cumulative correlated power system level, and adjusts the control signal in response to any difference between the cumulative correlated power system level and the desired power system level.

* * * * *